(12) United States Patent
O'Connell et al.

(10) Patent No.: US 9,388,327 B2
(45) Date of Patent: Jul. 12, 2016

(54) SPRAYABLE COATING COMPOSITION AND METHOD FOR ASPHALT SURFACES

(71) Applicant: Invia Pavement Technologies, LLC, Tulsa, OK (US)

(72) Inventors: Timothy M. O'Connell, Tulsa, OK (US); Ronnie J. Price, Sapulpa, OK (US); Andrew C. Fox, Tulsa, OK (US); Richard K. Steger, Broken Arrow, OK (US)

(73) Assignee: INVIA PAVEMENT TECHNOLOGIES, LLC, Tulsa, OK (US)

(*) Notice: Subject to any disclaimer, the term of this patent is extended or adjusted under 35 U.S.C. 154(b) by 0 days.

(21) Appl. No.: 14/299,493

(22) Filed: Jun. 9, 2014

(65) Prior Publication Data
US 2014/0373750 A1  Dec. 25, 2014

Related U.S. Application Data

(60) Provisional application No. 61/838,494, filed on Jun. 24, 2013.

(51) Int. Cl.
*C09D 195/00* (2006.01)
*E01C 7/35* (2006.01)
*C08L 95/00* (2006.01)

(52) U.S. Cl.
CPC ............ *C09D 195/005* (2013.01); *C08L 95/005* (2013.01); *E01C 7/353* (2013.01); *C08L 2555/28* (2013.01); *C08L 2555/52* (2013.01)

(58) Field of Classification Search
CPC ...... C09D 195/00; C08L 95/00; C04B 26/26; C04B 20/1044; C04B 24/36
See application file for complete search history.

(56) References Cited

U.S. PATENT DOCUMENTS

| | | | | |
|---|---|---|---|---|
| 3,126,350 A | * | 3/1964 | Borgfeldt | 516/43 |
| 3,539,368 A | * | 11/1970 | Harkness et al. | 106/277 |
| 4,056,401 A | * | 11/1977 | DeBough | C08L 95/005 106/277 |
| 5,925,695 A | * | 7/1999 | Ohtsuka et al. | 524/68 |

OTHER PUBLICATIONS

"PermaTill" From Stalite. http://www.permatill.com/about.php. Copyright 2009.*
"Stalite Rotary Kiln Expanded Slate Lightweight Aggregate" Bituminous Surface Treatment Projects. http://www.stalite.com/projects.php?cat=16. Copyright 2009.*
Netafim "Mesh vs. Micron Comparison Chart".*

* cited by examiner

*Primary Examiner* — Pegah Parvini
*Assistant Examiner* — Alexandra M Moore
(74) *Attorney, Agent, or Firm* — Bryan D. Zerhusen; Locke Lord LLP

(57) ABSTRACT

A sprayable coating composition, and method of application, for coating asphalt paving surfaces. In the coating composition, a low bulk density aggregate material of sprayable particle size is suspended in a sprayable asphalt emulsion in an amount sufficient to increase the micro-texture surface roughness of the cured coating.

18 Claims, 4 Drawing Sheets

SPRAYABLE COATING COMPOSITION AND METHOD FOR ASPHALT SURFACES

CROSS REFERENCE TO RELATED APPLICATION

This application claims the benefit of U.S. Provisional Application No. 61/838,494, filed Jun. 24, 2013, and incorporates the same herein by reference in its entirety.

FIELD OF THE INVENTION

The present invention relates to sprayable asphalt and aggregate compositions and methods for coating roads, parking lots, and other driving surfaces.

BACKGROUND OF THE INVENTION

It is well known that, for asphalt parking lots, a preventative maintenance treatment (typically an asphalt coating composition referred to as a "sealer") will commonly be applied to the paving surface every 2-5 years or so. The coating material will typically be comprised of liquid asphalt or an anionic asphalt emulsion and will be applied using a wand sprayer or a spraying machine. The coating desirably operates to (a) seal the surface from water intrusion, (b) improve the appearance of the pavement, (c) protect the underlying asphalt pavement from oxidation and UV damage, (d) protect the pavement from oil and gasoline spills, and (e) provide a surface which is easier to sweep, clean, shovel, and maintain. All of these benefits increase the service life of the pavement.

Unfortunately, after curing, the micro-texture of the asphalt spray coatings heretofore known in the art has been much smoother than the micro-texture of the underlying pavement surface so that the frictional resistance offered by the asphalt spray coating has been significantly less than that of the underlying pavement. This reduction in frictional resistance is not a concern in low speed environments. However, because of this significant loss in surface frictional resistance, asphalt spray maintenance coatings of this type have not been applied to asphalt road surfaces or to other asphalt paving surfaces upon which vehicles will be traveling at higher speeds.

Moreover, no successful means of modifying and significantly increasing the micro-texture roughness and surface frictional resistance of the cured spray coating has heretofore been provided. Typical sealers are not formulated with a viscosity to suspend the typical aggregates chosen to enhance friction in other typical paving applications. The frictional aggregates used in other applications derive their frictional characteristics from both larger particles which cannot be sprayed and from material properties chosen with a maximum value of hardness and density.

Consequently, a need exists for an improved sprayable asphalt and aggregate coating composition which (a) will provide a significantly increase degree of surface micro-texture roughness when cured, (b) preferably will not have a lower surface micro-texture roughness than the underlying pavement to which it is applied, (c) can be spray-applied using conventional equipment, (d) will be highly durable, (e) will provide improved micro-texture over the life of the spray coating, (f) will provide all of the other benefits of a superior parking lot seal coating, and (g) can be pre-mixed, stored, and transported for later use.

The micro-texture roughness of an asphalt surface can be measured, for example, using a Dynamic Friction Test (DFT) as set forth in ASTM E 1911. This test provides a measure of surface friction as a function of sliding speed. The DFT apparatus consists of a horizontal spinning disk fitted with a spring-loaded rubber slider that contacts the paved surface as the rotational speed decreases due to the friction generated between the slider and the paved surface. The measured torque generated by the slider force is used to calculate a surface friction value as a function of speed.

SUMMARY OF THE INVENTION

The present invention provides a sprayable asphalt and aggregate coating composition, and method of application, which satisfy the needs and alleviate the problems discussed above. The inventive sprayable coating composition is an easily stored, shipped, and applied fluid asphalt and aggregate composition which includes a fine, low bulk density aggregate material, that is surprisingly and unexpectedly effective for increasing the surface micro-texture roughness of the coating while also providing high durability. Moreover, the significant improvement in surface micro-texture provided by the inventive sprayable coating is such that, not only does the inventive composition provide superior performance as a spray sealer for asphalt parking lots, but can be used as a maintenance coating on asphalt roads and other asphalt pavement surfaces used for high speed vehicle traffic.

The inventive sprayable coating composition for asphalt paving surfaces preferably comprises: (a) a sprayable asphalt emulsion and (b) an aggregate material having an AASHTO T-19 loose bulk unit weight of not more than 115 pounds per cubic foot or an aggregate material having an ASTM C-29 loose bulk unit weight of not more than 115 pounds per cubic foot. It is to be understood that either the international standard ASTM C-29 could be used to measure the weight in pounds per cubic foot or the AASHTO T-19 standard could be used to measure the weight in pounds per cubic foot. The aggregate material is preferably suspended in the sprayable asphalt emulsion in an amount of from about 9% to about 27% by weight of the total final weight of the sprayable coating composition. In addition, it is also preferred that the sprayable asphalt emulsion comprise a cationic asphalt emulsion and that the size of the aggregate material be sufficiently fine that 100% of the aggregate material will pass a number 16 US sieve.

Further aspects, features, and advantages of the present invention will be apparent to those of ordinary skill in the art upon examining the accompanying Drawings and upon reading the following Detailed Description of the Preferred Embodiments.

DETAILED DESCRIPTION OF THE PREFERRED EMBODIMENTS

Figure 1:
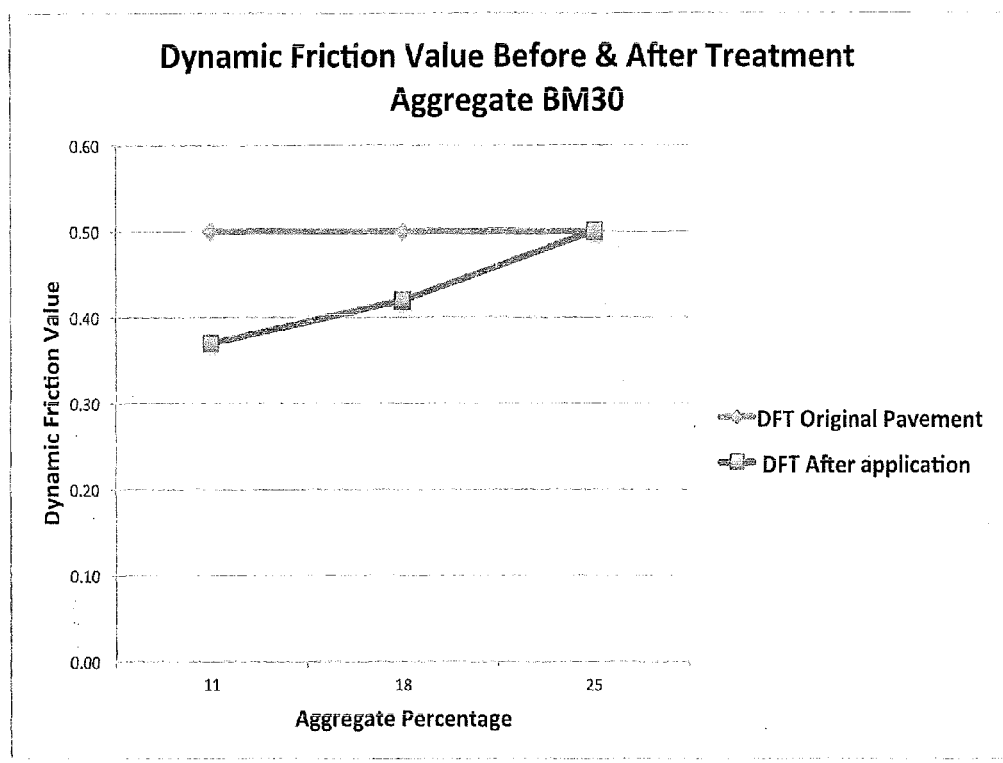
FIG. 1 illustrates the Dynamic Friction Test (DFT) results achieved by the coating compositions prepared and tested as described below in Example 1.

The present invention provides a sprayable coating composition, and a method of application, for spray sealing or spray coating all manner of asphalt parking, driving or walking surfaces.

The inventive sprayable coating composition for asphalt pavement surfaces preferably comprises: (a) a sprayable asphalt emulsion and (b) an aggregate material having an AASHTO T-19 loose bulk unit weight of less than 90 pounds per cubic foot. It is to be understood that either the international standard ASTM C-29 could be used to measure the weight in pounds per cubic foot or the AASHTO T-19 (2009) standard could be used to determine the weight in pounds per cubic foot throughout this application. Preferably, 100% of the aggregate material will pass a #16 US sieve. Also, the aggregate material is preferably suspended in the sprayable asphalt emulsion in an amount of from about 9% to about 27% by weight of the total final weight of the sprayable coating composition.

In addition, the sprayable asphalt emulsion preferably has thixotropic properties effective such that the aggregate material will remain suspended in the sprayable asphalt emulsion from the time that the frictional sealer composition is manufactured, shipped, and spray-applied to the pavement surface until the frictional sealer composition has set.

The sized and graded aggregate material used in the inventive coating composition provides the micro-texture in the finished pavement membrane to increase the measured dynamic friction of the coating. Our discovery of the correct specific gravity, bulk gravity, size, gradation and geometry play a significant role in providing a sprayable coating composition that can be applied in a practical manner and generate the desired surface micro-texture properties.

Surprisingly, rather than being a very hard material having a high bulk unit density, we have discovered that the aggregate material effective for improving the surface micro-texture of the inventive spray coating is an aggregate material which, as mentioned above, has a lower AASHTO T-19 Loose Bulk Density. This aggregate material is able to remain in suspension from the time that the inventive spray coating composition is manufactured, shipped, and applied until it has been allowed to set and cure. As a result, a significant proportion of the suspended aggregate material becomes bound at the coating surface.

In addition, because the amount of aggregate material which can be added to a sprayable asphalt composition is generally limited by weight, the lower bulk density of the aggregate material used in the inventive composition also allows a greater volume amount of the aggregate to be included in the composition, thus further increasing both the amount of aggregate material which can be suspended in the inventive coating composition and the number of particles which ultimately become bound at the coating surface.

The aggregate material used in the inventive coating composition preferably has an AASHTO T-19 loose bulk weight of from 45 to 90 pounds per cubic foot. The loose bulk weight of the material is more preferably in the range of from about 55 pounds per cubic foot to about 85 pounds per cubic foot and is most preferably in the range of from about to about 55 pounds to 84 pounds per cubic foot. In addition, the aggregate material will also preferably have an AASHTO T-19 rodded (i.e., packed) bulk unit weight which is not more than 98 pounds for cubic foot and is more preferably in the range of from about 66 pounds per cubic foot to about 94 pounds per cubic foot.

The aggregate material also preferably has a fine particle size distribution wherein 100% by weight of the material will pass a number 16 US sieve and only less than 20% by weight will pass a number 200 US sieve. Most preferably, the aggregate is a graded material having a particle size distribution wherein: (a) 100% by weight of the graded aggregate material will pass a number #16 US sieve and (b) a maximum of 5% by weight of the graded aggregate material will pass a number #200 US sieve.

Examples of aggregate materials preferred for use in the inventive sprayable coating composition include, but are not limited to, expanded calcined slate, calcined shale, crushed boiler slag, crushed trap rock, or a combination thereof. The aggregated material will most preferably be fractured expanded calcined slate.

As noted above, the aggregate material will preferably be present in the inventive sprayable coating composition in an amount in the range of from about 9% to about 27% by weight of the total final weight of the composition. The amount of aggregate material used will more preferably be from about 11% to about 25% by weight and will most preferably be about 18% by weight of the total final weight of the spray coating composition.

In the inventive coating, the sprayable asphalt emulsion composition in which the aggregate material is suspended comprises an asphalt emulsion. The asphalt emulsion will preferably be a cationic asphalt emulsion. In addition, the sprayable asphalt emulsion composition will also preferably comprise one or more, or all, of the following components:
 1) Clay,
 2) Mineral Filler,
 3) Polymer Latex,
 4) Rheological enhancers and stabilizers,
 5) Biocide or preservative, and/or
 6) Water The inventive sprayable coating composition is formulated to allow transport, storage and application with equipment typical of the pavement sealer industry. As will be understood by those in the art, the asphalt emulsion provides the primary carrier for the binder allowing the coating composition to adhere to the pavement, protect the surface from environmental degradation, and anchor the frictional aggregate to the pavement surface.

The clay component can be a non-expansive or an expansive clay. The clay provides a means of suspending the asphalt emulsion and aggregate mixture, as well as other components, in a thixotropic (shear thinning) fluid that prevents rapid separation while still allowing the material to be pumped, sprayed and applied without excessive effort. The clay also plays a role in the dried coating membrane by increasing stiffness and reducing the tendency to track and deform under traffic.

Mineral filler can be used to provide an additional reinforcement of the dried sealer membrane.

Polymer latex, or lattices, can be used to significantly increase the stiffness and toughness of the finished asphalt coating membrane and to reduce the tendency of the coating to soften under high pavement temperatures.

Rheological enhancers and stabilizers may be employed to provide and/or sustain the thixotropic property of the sealer in storage, transport and application and to thereby prevent separation of the components.

The biocide or preservative component prevents or reduces biological growth that may occur within the coating, thus reducing the likelihood of product degradation and odor generation.

In the application method of the present invention, the inventive coating composition can be applied using a conventional wand sprayer, a conventional sealer spray machine, or other conventional equipment.

The following examples are meant to illustrate, but in no way limit, the claimed invention.

Example 1

Three inventive cationic asphalt spray-coating compositions comprising 11% by weight, 18% by weight, and 25% by weight of Black Magnum 30 (BM30) aggregate material were prepared for testing. The BM30 was a finely crushed boiler slag material formed of carbonate silica. The BM30 had an AASHTO T-19 loose bulk unit weight of 79 pounds per cubic foot, an AASHTO T-19 rodded bulk unit weight of 90 pounds per cubic foot, and a graded particle size distribution wherein 100% of the material passed a number #16 US sieve and less than 1% of the material passed a number #200 US sieve.

The identities and relative amounts of the other components of the 11 wt. % composition were: 34.9 wt. % Water, 29 wt. % CSS-1HH, 18 wt. % Dunn B Ball Clay, 2.0 wt. % Carbon, 5.0 wt. % Tegra GT, and 0.06 wt. % PCMX Biocide. The same non-aggregate components and the same relative parts by weight proportions of the non-aggregate components as used on the 11% aggregate composition were also used in the 18% and 25% aggregate compositions.

The three coating compositions were each applied to an asphalt pavement surface which, prior to coating, had an ASTM E 1911 Dynamic Friction Test (DFT) value of 0.50 at 20 Km/h. As explained above, this test, which is used to evaluate the micro-texture roughness of a surface, provides a measure of surface friction as a function of sliding speed.

After application and drying, the surface micro-texture of each of the three BM30 test compositions was also evaluated using the ASTM E 1911 DFT procedure. The results of these tests are illustrated in FIG. 1. The measured DFT values after application were 0.37 at 20 Km/h for the 11 wt. % BM30 coating, 0.42 at 20 Km/h for the 18 wt. % BM30 coating, and 0.50 at 20 Km/h for the 25 wt. % BM30 coating. Thus, significant recovery of the lost micro-texture caused by the non-aggregate components of the asphalt emulsion was achieved by adding 18 wt. % of the BM30 aggregate and full recovery of the original micro-texture surface friction value was achieved at a BM30 concentration of 25 wt. %.

Example 2

Figure 2:
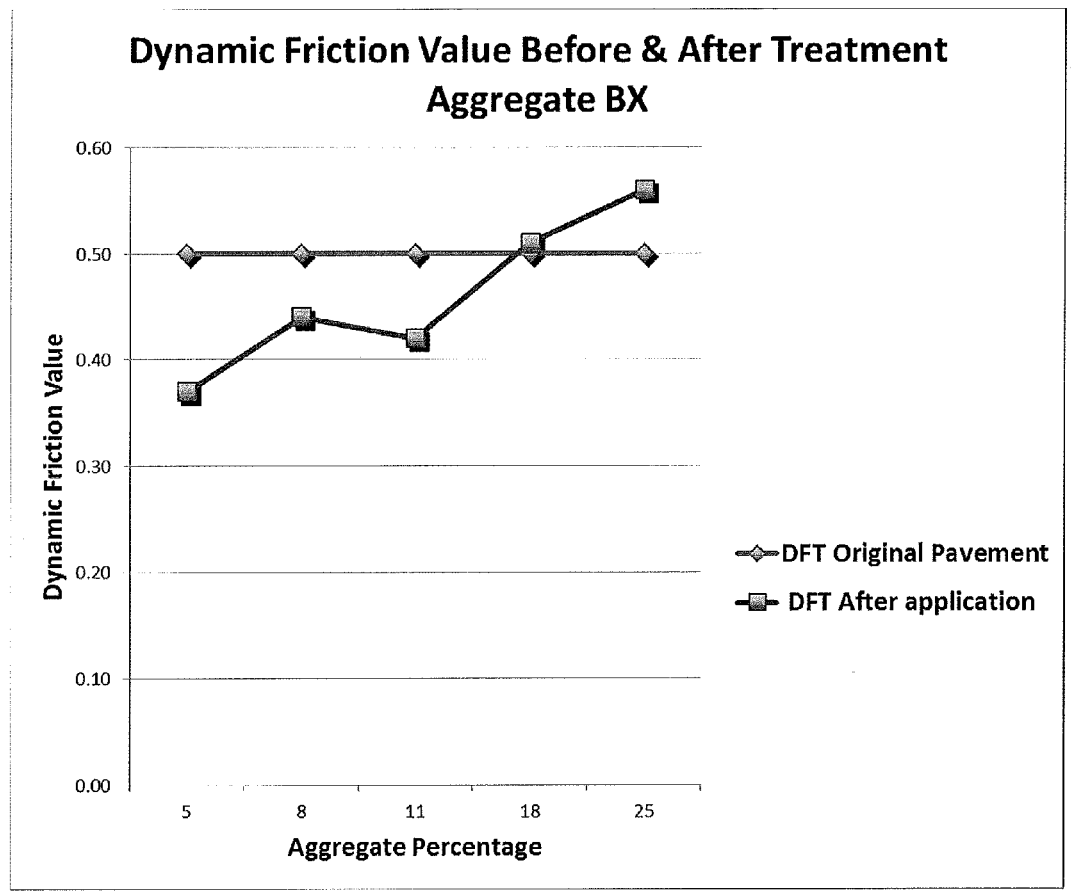
FIG. 2 illustrates the Dynamic Friction Test (DFT) results achieved by the coating compositions prepared and tested as described below in Example 2.

Five inventive coating compositions containing 5 wt. %, 8 wt. %, 11 wt. %, 18 wt. % and 25 wt. % aggregate material were prepared, applied and tested in the same manner as described in Example 1 except that the aggregate material used in these coating compositions was Buildex-1/16 (BX). The results of the tests for the BX (Buildex 1/16) aggregate material are illustrated in FIG. 2.

The BX aggregate material had an AASHTO T-19 loose bulk unit weight of 58 pounds per cubic foot and an AASHTO T-19 rodded bulk unit weight of 64 pounds per cubic foot. The BX aggregate material also had a graded particle size distribution wherein 100% of the material passed a 1/16" US sieve.

The pavement surface used for testing had an uncoated DFT value of 0.50 at 20 Km/h. After application and drying, the measured DFT values of the coatings were 0.37 at 20 Km/h for the 5 wt. % BX coating, 0.44 at 20 Km/h for the 8 wt. % BX coating, 0.42 at 20 Km/h for the 11 wt. % BX coating, 0.51 at 20 Km/h for the 18 wt. % BX coating, and 0.56 at 20 Km/h for the 25 wt. % BX coating. Thus, significant recovery of the lost micro-texture caused by the non-aggregate components of the asphalt emulsion was achieved at by adding just 8-11 wt. % of the BX aggregate and full recovery of the original micro-texture surface friction value was achieved at a BX concentration of 18 wt. %.

Example 3

Figure 3:
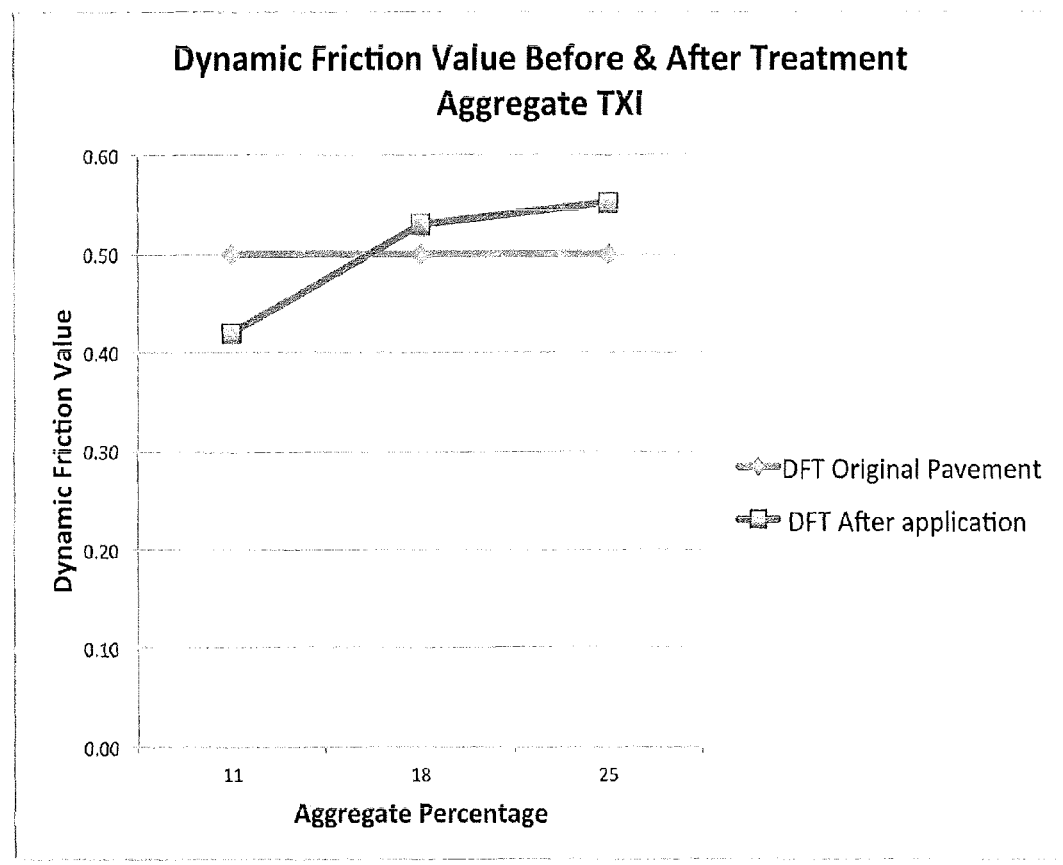
FIG. 3 illustrates the Dynamic Friction Test (DFT) results achieved by the coating compositions prepared and tested as described below in Example 3.

Three inventive coating compositions containing 11 wt. %, 18 wt. % and 25 wt. % aggregate material were prepared, applied and tested in the same manner as described in Example 1 except that the aggregate material used in these coating compositions was TXI. The results of the tests for the TXI material are illustrated in FIG. 3.

The TXI aggregate material was formed of fractured, expanded, calcined slate and had an AASHTO T-19 loose unit weight of 57 pounds per cubic foot, and a rodded loose weight of 66 pounds per cubic foot. The TXI aggregate material also had a graded particle size distribution which passed a number 16 US sieve and 19.6% of the material passed a number 200 US sieve.

The pavement surface use for testing had an uncoated DFT value of 0.50 at 20 Km/h. After application and drying, the measured DFT values of the coatings were 0.42 at 20 Km/h for the 11 wt. % TXI coating, 0.53 at 20 Km/h for the 18 wt. % TXI coating, and 0.55 at 20 Km/h for the 25 wt. % TXI coating. Thus, significant recovery of the lost micro-texture caused by the non-aggregate components of the asphalt emulsion was achieved by adding just 11 wt. % of the TXI aggregate. Moreover, the micro-texture surface friction value at a TXI concentration of 18 wt. % exceeded the DFT value of the original, uncoated asphalt pavement.

Example 4

Figure 4:
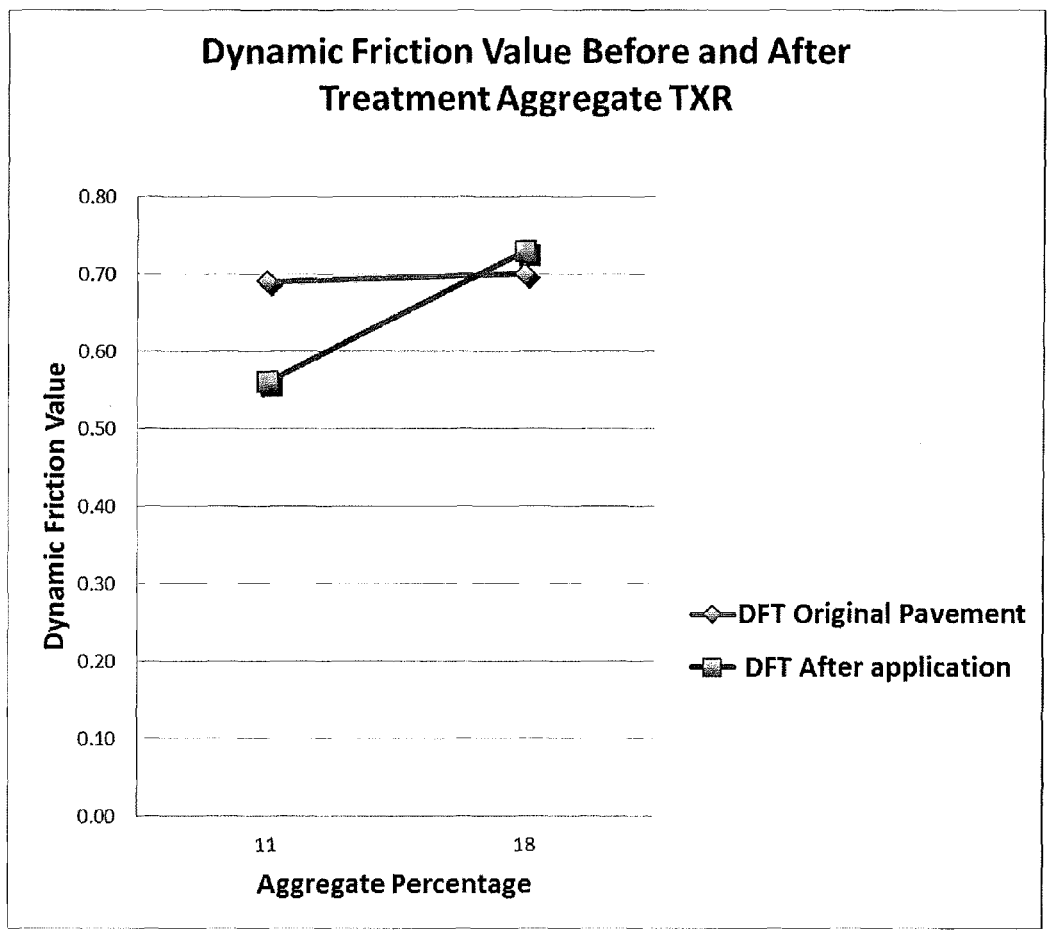
FIG. 4 illustrates the Dynamic Friction Test (DFT) results achieved by the coating compositions prepared and tested as described below in Example 4.

Two inventive coating compositions containing 11 wt. % and 18 wt. % aggregate material were prepared, applied and tested in the same manner as described in Example 1 except that the aggregate material used in these coating compositions was another batch of TXI material which will be referred to as TXR. The results of the tests for the TXR material are illustrated in FIG. 4.

The TXR aggregate material was also formed of fractured, expanded, calcined slate. The TXR material had an AASHTO T-19 loose bulk unit weight of 57 pounds per cubic foot and an AASHTO T-19 rodded bulk unit weight of 66 pounds per cubic foot. In addition, the TXR aggregate material had a graded particle size distribution which passed a number 16 US sieve and 19.6% of the material passed a number 200 US sieve.

The pavement surface use for testing had an uncoated DFT value of between 0.69-0.70 at 20 Km/h. After application and drying, the measured DFT values of the coatings were 0.56 at 20 Km/h for the 11 wt. % TXR coating and 0.73 at 20 Km/h for the 18 wt. % TXR coating. Thus, once again, significant recovery of the lost micro-texture caused by the non-aggregate asphalt emulsion components was achieved by adding just 11 wt. % of the TXR aggregate and full recovery was obtained at a TXI concentration of 18 wt. %

Thus, the present invention is well adapted to carry out the objects and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within this invention as defined by the claims.

What is claimed is:

1. A sprayable coating composition for asphalt paving surfaces comprising: a sprayable asphalt emulsion, clay, and an aggregate material having an AASHTO T-19 loose bulk unit weight of not more than 115 pounds per cubic foot, wherein said aggregate material is suspended in said sprayable asphalt emulsion in an amount of from about 9% to about 27% by weight of a total final weight of said sprayable coating composition.

2. The sprayable coating composition of claim 1 wherein said sprayable asphalt emulsion comprises a cationic asphalt emulsion.

3. The sprayable coating composition of claim 1 wherein 100% of said aggregate material will pass a #16 US sieve.

4. The sprayable coating composition of claim 1 further comprising at least one of a mineral filler, polymer latex, rheological enhancers and stabilizers, biocide or preservative, and water.

5. The sprayable coating composition of claim 1 wherein said aggregate material is selected from expanded calcined slate, calcined shale, crushed boiler slag, crushed trap rock, or a combination thereof.

6. The sprayable coating composition of claim 1 wherein said aggregate material is a fractured expanded calcined slate.

7. The sprayable coating composition of claim 1 wherein: 100% of said aggregate material will pass a number 16 US sieve and not more than 20% by weight of said aggregate material will pass a number 200 US sieve.

8. The sprayable coating composition of claim 1 wherein said aggregate material is suspended in said sprayable asphalt emulsion in an amount of from about 11% to about 25% by weight of said total final weight of said sprayable coating composition.

9. The sprayable coating composition of claim 1 wherein said aggregate material is suspended in said sprayable asphalt emulsion in an amount of about 18% by weight of said total final weight of said sprayable coating composition.

10. A method of coating an asphalt surface comprising the step of spraying a coating composition onto said asphalt surface, said coating composition comprising: a sprayable asphalt emulsion, clay, and an aggregate material having an AASHTO T-19 loose bulk unit weight of less than 90 pounds per cubic foot, wherein said aggregate material is suspended in said sprayable asphalt emulsion in an amount of from about 9% to about 27% by weight of a total final weight of said coating composition.

11. The method of claim 10 wherein said sprayable asphalt emulsion comprises a cationic asphalt emulsion.

12. The method of claim 10 wherein 100% of said aggregate material will pass a number #16 US sieve.

13. The method of claim 10 wherein said coating composition further comprises at least one of a mineral filler, polymer latex, rheological enhancers and stabilizers, biocide or preservative, and water.

14. The method of claim 10 wherein said aggregate material is selected from expanded calcined slate, calcined shale, crushed boiler slag, crushed trap rock, or a combination thereof.

15. The method of claim 10 wherein said aggregate material is a fractured expanded calcined slate.

16. The method of claim 10 wherein: 100% of said graded aggregate material will pass a number 16 US sieve, and from 0% to 10% by weight of said graded aggregate material will pass a number 200 US sieve.

17. The method of claim 10 wherein said aggregate material is suspended in said sprayable asphalt emulsion in an amount of from about 11% to about 25% by weight of said total final weight of said coating composition.

18. The method of claim 10 wherein said aggregate material is suspended in said sprayable asphalt emulsion in an amount of about 18% by weight of said total final weight of said coating composition.

\* \* \* \* \*